United States Patent [19]
Ray

[11] Patent Number: 5,467,025
[45] Date of Patent: Nov. 14, 1995

[54] SENSORLESS ROTOR POSITION MEASUREMENT IN ELECTRIC MACHINES

[75] Inventor: William F. Ray, Attenborough, England

[73] Assignee: Switched Reluctance Drives Limited, Leeds, England

[21] Appl. No.: 70,190

[22] Filed: Jun. 2, 1993

[30] Foreign Application Priority Data

Jun. 3, 1992 [GB] United Kingdom ............... 9211685

[51] Int. Cl.$^6$ .............................. G01R 31/34; H02P 6/00
[52] U.S. Cl. ............................................ 324/772; 318/701
[58] Field of Search ............................. 324/772, 158.1, 324/545; 318/700, 701

[56] References Cited

U.S. PATENT DOCUMENTS

| | | | |
|---|---|---|---|
| 3,911,339 | 10/1975 | Rettig | 318/701 |
| 4,060,753 | 11/1977 | Okuyama et al. | 318/700 |
| 4,593,240 | 6/1986 | Blaschke | 324/772 |
| 4,943,760 | 7/1990 | Byrne et al. | 318/701 |
| 5,043,643 | 8/1991 | Hedlund et al. | 318/701 |
| 5,173,650 | 12/1992 | Hedlund | 318/701 |
| 5,196,775 | 3/1993 | Harris et al. | |

FOREIGN PATENT DOCUMENTS

| | | |
|---|---|---|
| 0500295 | 2/1992 | European Pat. Off. . |
| 1591346 | 3/1977 | United Kingdom . |
| 91/02401 | 2/1991 | WIPO . |

OTHER PUBLICATIONS

Chappell et al.; "Microprocessor Control . . . " IEE Proceedings B (Electric Power Applications); vol. 131; No. 2; Mar. 1984; pp. 51–60.

"A New Sensorless Position Detector For SR Drives", M. Vungi et al., 4th Int. Conf. on Power Electronics and Var. Speed Drives, 249–252.

"Flux/Current Methods for SRM Rotor Position Estimation", Lyons et al., IEEE IAS Conf. Dearborn, Sep. 1991, pp. 482–487.

"Switched Reluctance Motor Drive without Direct Rotor Position Sensing", Panda et al., Proc. IEEE; IAS Conf., Oct. 1990, pp. 525–530.

"A New Algorithm for Sensorless Operation of Permanent Magnet Motors", Ertugrul et al., IEEE IAS Conf. Proc., Sep. 1992, pp. 414–421.

"Varaible-speed Switched Reluctance Motors", P. J. Lawrence et al., IEE Proc. B, Electr. Power App., vol. 127, No. 3, pp. 253–265, 1980.

"Accurate Sensorless Rotor Position Detection in an SR Motor", Muungi et al., EPE Conf. Proc. 1991 vol. I, pp. 390–393.

Stephenson, J. M., Switched Reluctance Motors, Section 2, IEEE Tutorial given at IAS Conference, Seattle, Oct. 12, 1990, pp. 4–35.

MacMinn, Stephen R., Control of the Switched Reluctance Machine, Section 3, IEEE Conference, Oct. 12, 1990, pp. 36–59.

Mvungi, N. M., Stephenson, J. M., Accurate Sensorless Position Detection in an SR Motor, EPE Firenze, 1991.

*Primary Examiner*—Ernest F. Karlsen
*Attorney, Agent, or Firm*—Patterson & Keough

[57] ABSTRACT

A sensorless rotor position measurement system comprises a digital processor (6) which receives signals from current and flux sensors (7, 8) of the current and flux associated with a phase winding of the machine. The measurement of the current and flux is enabled at a predicted reference rotor position. The measurements are compared with stored values of current and flux and an error between the actual and the predicted reference position calculated. The calculated rotor position can then be used to predict the instant the rotor will reach the next reference position.

22 Claims, 4 Drawing Sheets

5,467,025

SENSORLESS ROTOR POSITION MEASUREMENT IN ELECTRIC MACHINES

FIELD OF THE INVENTION

This invention relates to the measurement of rotor position for an electric machine. The invention is particularly applicable to switched reluctance machines.

BACKGROUND OF THE INVENTION

The principle of operation of a switched reluctance (SR) motor and its construction, energisation and control are well known with many publications such as that by P.J. Lawrenson et al "Variable-speed switched reluctance motors" IEE Proc B, Electr Power Appl., Vol 127, No 3, pp 253–265, 1980.

It is also well known that to obtain the best performance from an SR motor or generator the excitation of its phases should be carefully timed in relation to rotor position (see GB 1591346). This has previously necessitated the use of an incremental rotor position transducer which has generally been a disc with teeth or lines together with an optical or electromagnetic sensor which is able to detect the instants the teeth or lines cross prescribed positions.

The incorporation of a rotor position transducer on an SR motor creates additional electrical connections, additional cost and a potential source of unreliability. Various methods have therefore been proposed to eliminate the rotor position transducer. As an alternative it is possible to deduce rotor position by measurement and examination of the current and flux-linkage in one or more phases of the motor. This is commonly known as sensorless rotor position measurement. Since phase current generally needs to be measured in any case for control purposes and flux-linkage can be inexpensively obtained from measurement of phase voltage, sensorless rotor position measurement is commercially beneficial.

Sensorless methods generally depend on stored information of the flux-current-rotor position characteristics of the motor. A typical example of these characteristics is shown in FIG. 1. The storage of this data entails a two-dimensional array of significant size to achieve acceptable accuracy. Some methods are only appropriate for relatively low speed operation for which the well known 'chopping' mode of current control applies and other methods are only appropriate for relatively high speed operation for which the well known 'single-pulse' mode of current control applies.

A method which is more suited to lower speed operation that is known (for example, N M Mvungi and J M Stephenson "Accurate sensorless rotor position detection in an SR motor" EPE Conf Proc 1991 Vol I pps 390–393) involves the application of exploratory current pulses to each phase winding at periods during which the phase is not energised for torque production. To avoid a counter-productive torque these pulses need to be small in magnitude and, as a result, the measured flux is influenced by currents in other phases. This can cause error and corrections need to be made which require the additional two-dimensional storage of mutual magnetisation data.

A method by Hedlund (see WO91/02401) which is more suited to higher speed operation utilises the normal phase currents for position measurement purposes. However this method necessitates the continual sampling of flux and current and comparison of flux with stored values for a reference position. This may necessitate a dedicated digital processor to perform the sensorless position measurement.

An object of the present invention is to provide sensorless position measurement by sampling the current and flux in a phase only once per energisation cycle. This may enable the same digital processor which is used for the SR motor control to be used also for determining rotor position.

SUMMARY OF THE INVENTION

According to the invention a position sensing system for an electric machine with one or more phases, comprises at least one current transducer arranged for measurement of the current in a monitored phase winding, means for deriving a measurement of the magnetic flux linking said monitored phase winding, and control means operable to measure, for the monitored phase winding, said current and flux simultaneously at a predicted position of a reference rotor angular position, the angular error between said predicted position and an actual reference angular position being determined by a comparison of the measured current and flux with the expected current and flux at the actual reference position.

BRIEF DESCRIPTION OF THE DRAWINGS

The invention can be put into practice in various ways one of which will now be described with reference to the accompanying drawings, in which.

DETAILED DESCRIPTION OF A PREFERRED EMBODIMENT

In the following:

θ represents rotor position

ψ represents phase flux linkage i represents phase current

ψ represents phase volt-seconds $v_s$ represents direct source voltage

The reference rotor position $θ_r$ for a phase will be different depending on whether the machine is motoring or generating and on whether the speed is above or below some threshold value.

Figure 2:
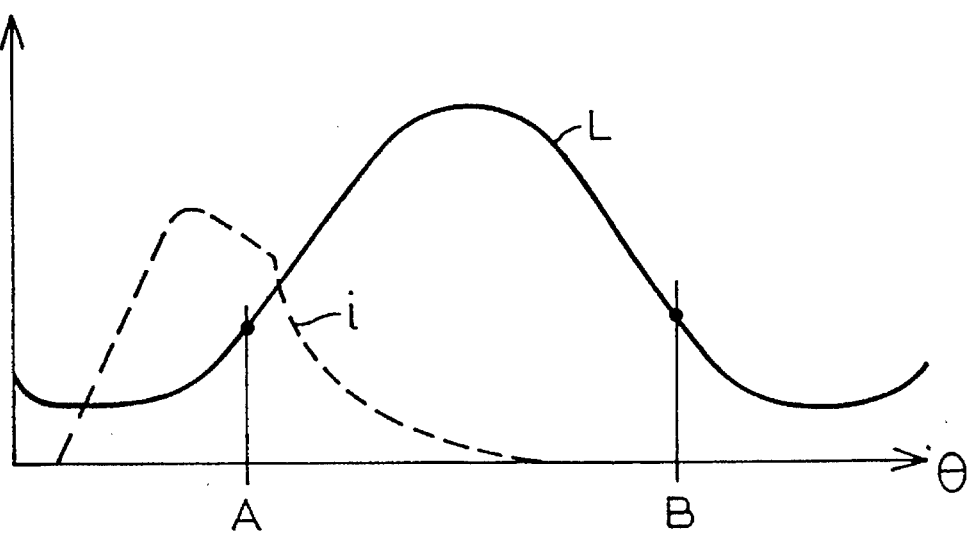
FIG. 2 shows two typical reference rotor positions for different modes of operation as related to the inductance for a phase.

If the speed is above the threshold (the "higher speed mode") and the machine is motoring, the reference position for a phase is preferably such that for this position the phase inductance is increasing (shown typically as position A in FIG. 2). The reference position for this case should also preferably be chosen such that current will normally be present in the phase at this position.

If the speed is above the threshold and the machine is generating, the reference position for a phase is preferably such that, for this position, the phase inductance is decreasing (shown typically as position B in FIG. 2). The reference position for this case should also be chosen such that current will normally be present in the phase at this position.

If the speed is below the threshold (the "lower speed mode") and the machine is motoring, the reference position for a phase will be preferably the same as position B but may be another position in the falling inductance region.

If the speed is below the threshold and the machine is generating, the reference position for a phase will be preferably the same as position A but may be another position in the rising inductance region.

The threshold speed will depend on the motor design and application but in general will be set as low as is commensurate with satisfactory sensorless rotor position measurement using the higher speed reference position. For some applications only the higher speed reference position need be used, in which case the threshold speed will be zero.

Speed may be measured by timing the interval between measured rotor positions or by using known frequency to voltage conversion techniques as for previous SR motor control systems.

Figure 3:
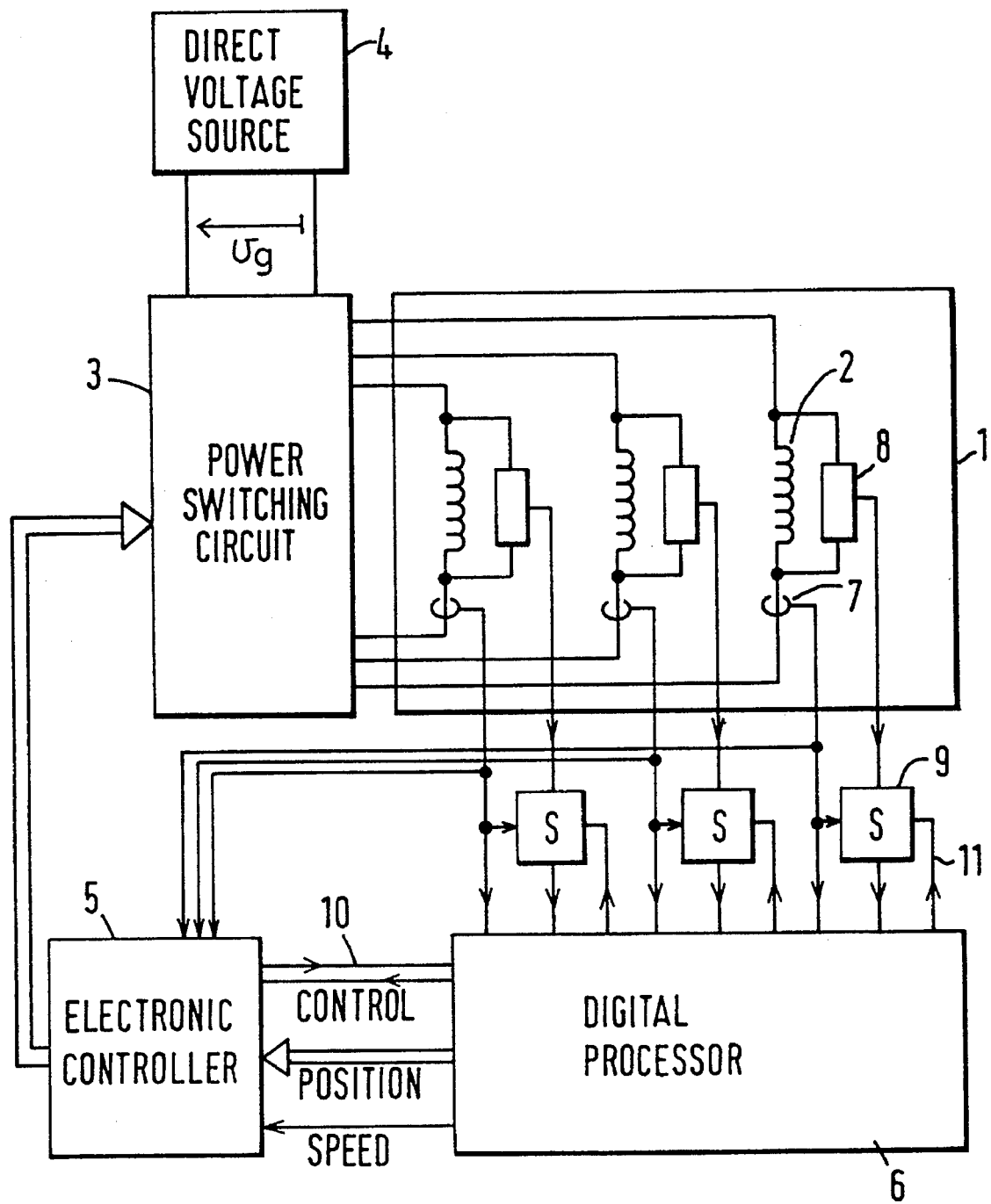
FIG. 3 is a schematic diagram illustrating one embodiment of the sensorless rotor position measurement system of the invention.

FIG. 3 is a schematic diagram showing a particular embodiment whereby rotor position can be measured. A switched reluctance motor 1 has a number of phase windings 2 which are energised by means of a power switching circuit 3 containing semiconductor switches and drawing power from (or returning power to) a direct voltage source 4. The direct voltage source may be obtained by rectifying an ac mains supply. The semiconductor switches are turned on and off, depending on the rotor position, according to previously known strategies, by an electronic controller 5. To execute these strategies the electronic controller requires information on the phase currents and the rotor position and speed.

The invention does not concern the form of direct voltage source, the power switching circuit or the control strategies, which have all been described in various publications, and these aspects will not be further detailed.

Figure 1:
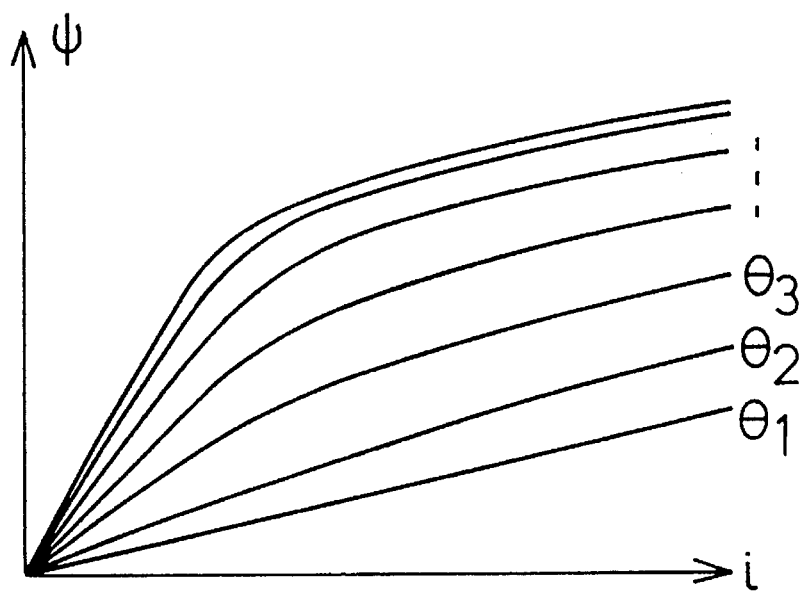
FIG. 1 is a graph of flux-current-rotor position characteristics of an SR motor.

The means preferred for determining the rotor position comprise a digital processor 6, one or more current transducers 7 for providing the digital processor with a measurement of phase current(s), and one or more voltage transducers 8 and resettable electronic integrators 9 for providing the digital processor with a measurement of phase flux linkage. The current measurement signals are also provided to the electronic controller and to the resettable integrators. Although for the convenience of illustration FIG. 1 shows the current and voltage transducers in the box representing the motor 1, in practice these transducers will be contained in the power switching circuit 3 so as to minimise the number of connections to the motor.

A control signal interface 10 connects the electronic controller with the digital processor and control signals for initiating and resetting the integrators 9 pass from the digital processor along lines 11. The digital processor may also include analogue to digital converters to convert the measured values into digital form if necessary.

Consider operation in the higher speed mode under motoring conditions and suppose that, at a predicted instant in time, the rotor position $\theta_m$ is close to the reference position $\theta_r$ for a particular phase which for convenience will be called phase 1. At the predicted instant, measurements are made of the flux $\psi_m$ and current $i_m$ for phase 1.

Figure 4:
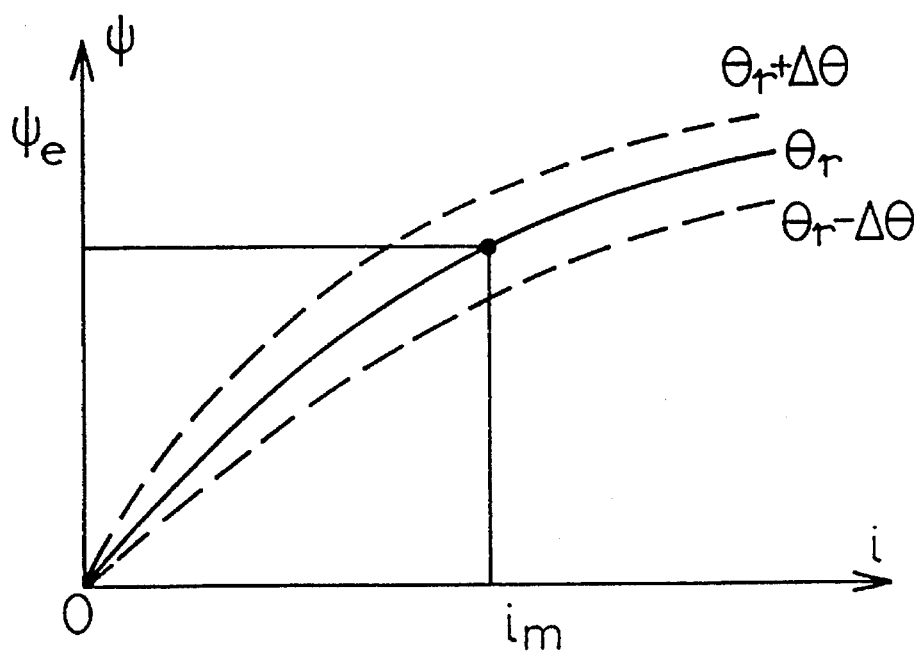
FIG. 4 is a graph of variations of a phase flux-linkage with current for reference rotor positions.

FIG. 4 shows the variation of flux $\psi$ with current i for the reference rotor position $\theta_r$ and from this characteristic the expected flux $\psi_e$ for the measured current $i_m$ can be calculated. Flux $\psi_e$ is the flux which would be measured if the predicted rotor position $\theta_m$ was identical to the reference position $\theta_r$.

In order to compare $\psi_m$ with $\psi_e$ for any measured current $i_m$ it is therefore a feature of this embodiment to store in the digital processor, for the reference position, values of flux $\psi$ for a set of values of phase current i. This has the advantage, compared to other methods of sensorless position detection, that only a single dimensional array of values is required. The difference between the measured flux $\psi_m$ and the expected flux $\psi_e$ is calculated by the digital processor as $$\Delta\psi = \psi_m - \psi_e \qquad (1)$$

FIG. 4 also shows the variation of flux $\psi$ with current i for position $\theta_r - \Delta\theta$, slightly before the reference position, and for $\theta_r + \Delta\theta$, slightly after the reference position. It will be seen that for a given current, $\psi$ increases with $\theta$ for the region of the reference position for the case of the higher speed mode under motoring conditions.

Figure 5:
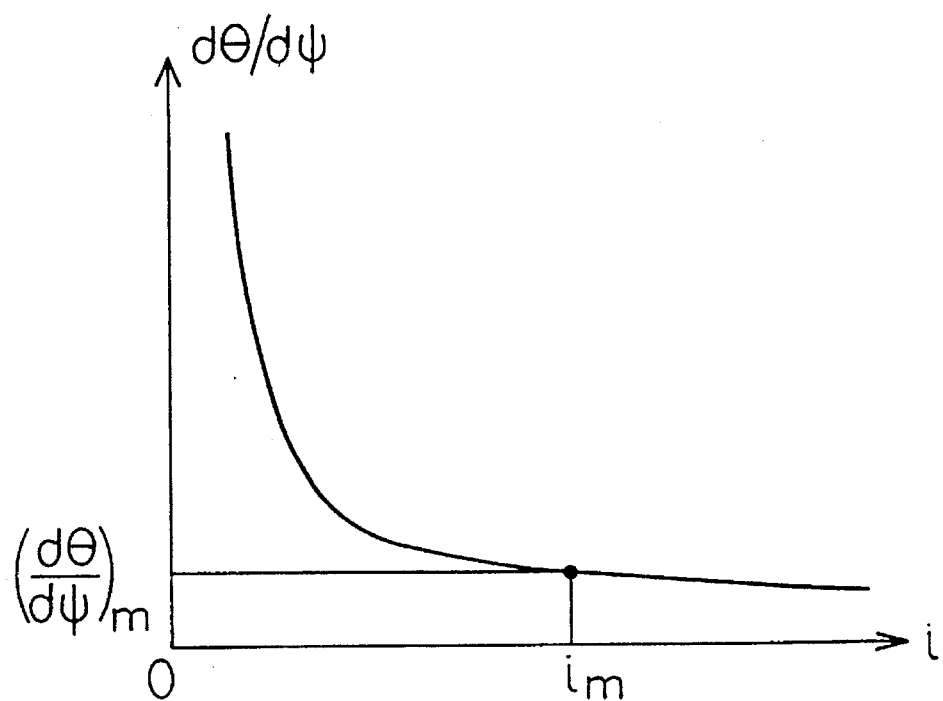
FIG. 5 is a graph of the variation with current of the partial derivative of angle with respect to flux for a given reference rotor position.

FIG. 5 shows the variation of the change of flux with rotor angle $(\partial\theta/\partial\psi)$ with current i for the reference rotor position $\theta_r$ and from this characteristic the value $(\partial\theta/\partial\psi)_m$ can be determined for the measured current $i_m$.

The angular difference $\Delta\theta$ between the predicted position $\theta_m$ and the reference position $\theta_r$ can then be calculated by the digital processor as $$\Delta\theta = \left\{ \frac{\partial\theta}{\partial\psi} \right\}_m \cdot \Delta\psi \qquad (2)$$

In order to determine the angular difference between the predicted position (at which the measurements of flux and current are made) and the reference position, it is therefore also a feature of this embodiment to store in the digital processor for the reference position values of partial derivative $\partial\theta/\partial\psi$ (or its inverse $\partial\theta/\partial\psi$) for a set of values of phase current i.

Since the reference position $\theta_r$ is known, the true rotor position at the predicted instant in time may be calculated from $\Delta\theta$ as $$\theta_m = \theta_r + \Delta\theta$$

The expected time to the next rotor position can then be estimated using the known value of motor speed. Under accelerating or decelerating conditions a correction may need to be made to the motor speed.

If all phases are used for measurement the next rotor reference position will be that for phase 2 (or whatever is the next phase in the sequence). For an n-phase motor with p rotor poles the angle of rotation to this position will be $(360/np)° - \Delta\theta$ and, by dividing this angle by the speed, the time required to reach this next position can be estimated.

If only phase 1 is used for measurement, the next rotor reference position will be after a rotation of $(360/p)° - \Delta\theta$ and, by dividing this angle by the speed, the time required to reach this position can be estimated.

The predicted time to the next reference position is then counted out using a high frequency clock by known means and at the instant such time has elapsed a further measurement of flux $\psi_m$ and current $i_m$ is made for the corresponding phase. Due to changes in speed, and tolerances in stored data and calculations, the predicted position $\theta_m$ will not be identical to the reference position $\theta_r$. The angular difference $\theta_r - \theta_m$ can again be calculated using equations (1) and (2) and the procedure outlined above.

The process of predicting rotor positions on a phase by phase basis and measuring the true rotor position at each measurement instant is repeated to provide an incremental indication of rotor position as a direct replacement for existing optical or electromagnetic rotor position sensors.

The procedure for the case of higher speed operation under regenerating conditions is the same as described above except that the values of $\partial\theta/\partial\psi$ shown in FIG. 5 will be negative (rather than positive) for the corresponding typical reference rotor position shown as position B in FIG. 2. If position B is symmetrically opposite position A (with respect to the maximum inductance position) then only one set of values for each of FIGS. 4 and 5 need to be stored in the digital processor and the sign change for regenerating conditions appropriately taken into account in the calculations. However, if positions A and B are essentially different then a set of values for both FIG. 4 and FIG. 5 for both motoring and regenerating conditions will need to be stored.

For the lower speed mode when the well known current chopping control is operative it is not appropriate to utilise the main excitation current for the phase for rotor position measurement purposes. In this case exploratory current pulses are injected at such times as the phase is not normally energised.

Consider the case of lower speed motoring. The rotor reference position for a phase is now taken to be position B (i.e. the same or approximately the same position as for higher speed generating). As for the higher speed cases the next rotor reference position is predicted on a phase by phase basis. On arriving at the predicted position a short duration voltage pulse is applied to the phase by the power switching circuit and the flux and current are measured at the termination of the voltage pulse. The instruction for executing the voltage pulse is supplied to the electronic controller 5 by the digital processor 6 using the control interface 10 shown in FIG. 3. The difference between the predicted rotor position $\theta_m$ and the rotor reference position $\theta_r$ is calculated on the same basis as described above. The true rotor position is thereby established at each instant in time the measurements are made.

The case of lower speed regenerating is the same as for lower speed motoring except that the reference rotor position is typically position A rather than position B.

The invention is therefore applicable to all speeds of operation whether the machine is motoring or regenerating.

Various arrangements may be used for the measurement of flux. Any known form of flux transducer could be used. However the measurement is preferably by means of analogue or digital electronic resettable integrators (which integrate the phase voltage with respect to time t), together with means for compensating for the resistive voltage in the phase winding.

The integrator executes the equation:

$$\psi = \int_{t_o}^{t_m} (v - iR)\, dt \qquad (3)$$

where v is the phase voltage i is the phase current

R is the phase resistance $t_m$ is the instant of measurement

The integrator start time $t_o$ is arranged to be the instant of application of voltage to the phase each time the phase is energised (for the higher speed mode) or each time an exploratory pulse is applied (for the lower speed mode). At time $t_o$ the current i is zero. The digital processor is informed of the instant of application of the voltage to the phase by the electronic controller using the control interface (10) shown in FIG. 3.

The integrator is reset by the digital processor after each flux reading has been made.

Figure 6:
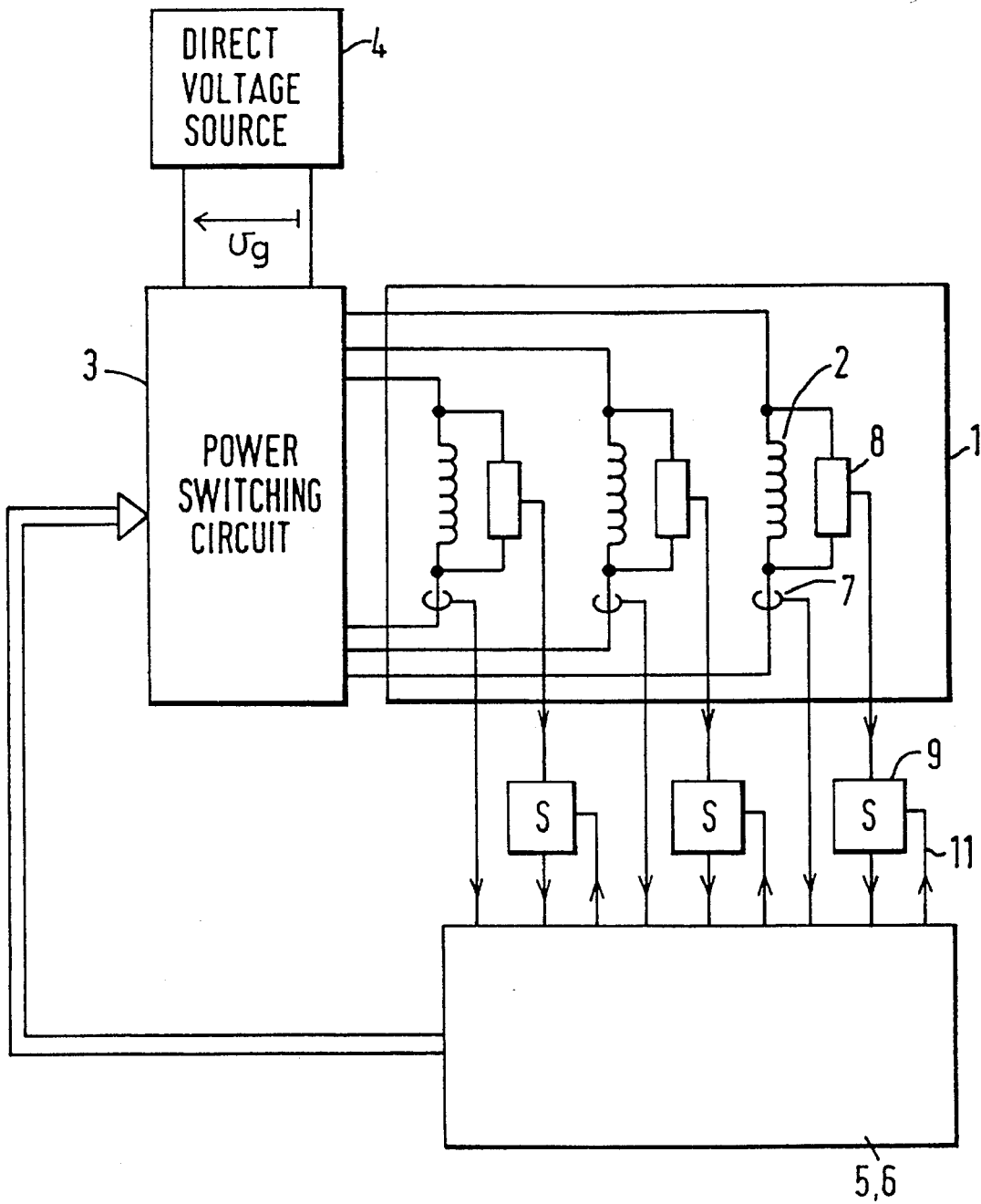
FIG. 6 is a schematic diagram illustrating another embodiment of the sensorless rotor position measurement system of the invention.

The digital processor is only required to start and terminate the integration process and to execute the calculations following the current and flux measurement which enable the next rotor reference position to be predicted. This may represent only a short part of the time interval between successive predicted positions and for the remaining time the digital processor will be idle. It is therefore possible to utilise the existing electronic controller 5 in FIG. 3 also to fulfil the role of the digital processor 6 in FIG. 3 and thereby avoid the need for a separate digital processor for the purpose of rotor position measurement. The use of a single processor/controller is an advantage of the invention, and the corresponding system is shown schematically in FIG. 6.

In applications for which the direct source voltage $v_s$ (see FIG. 3) is relatively large compared to the voltage drop across the semiconductor switches in the power switching circuit, the direct source voltage may be measured and integrated in place of the individual phase voltage. This has the advantage that only one voltage need be measured. However, in this case for the higher speed mode of operation it is necessary for the reference position to be in advance of the commutation position for the phase. This can be arranged by suitable choice of the reference position.

The flux is then measured as:

$$\psi_m = \int_{t_o}^{t_m} (v_s - iR)\, dt \qquad (4)$$

As an alternative to using separate electronic integrators, the digital processor may be used by multiplying the direct supply (or phase) voltage by time on a step by step basis. This has the disadvantage that the digital processor is substantially busy and would need to be a separate unit.

However, provided the supply voltage is substantially constant and large compared with the resistive voltage iR, various approximations may be made. For example:

$$\psi_m = (v_s - ki_m R)(t_m - t_o) \qquad (5)$$

where k is a constant, typically k=0.5, such that:

$$ki_m(t_m - t_o) \approx \int_{t_o}^{t_m} i\, dt$$

As a further embodiment, in the case where the supply voltage $v_s$ is relatively large compared with the resistive voltage iR, the need to compensate for the resistive voltage drop may be avoided by using a modified value for the flux in the stored data represented by FIGS. 4 and 5.

In this case the values of phase flux linkage $\psi$ for a particular current i and particular rotor position $\theta$ stored in the digital processor as represented by FIGS. 4 and 5 are replaced by values of the volt-second integral $\psi'$ required to create the phase current i for the rotor position $\theta$ as given by $$\psi' = \int v\, dt$$

In testing the machine to establish the table of values of $\psi'$ and $\partial\theta/\partial\psi$, v may for convenience, be held constant (provided v is relatively large) and is preferably equal to $v_s$.

The rotor position measurement procedure is the same as already described in this application except that the measured flux $\psi_m$ and expected flux $\psi_e$ and partial derivative $(\partial\theta/\partial\psi)$ are replaced by $\psi'_m$, $\psi'_e$ and $(\partial\theta/\partial\psi')$ respectively where $\psi'_e$ and $(\partial\theta/\partial\psi')$ are obtained as described from the stored data represented by FIGS. 4 and 5 and where the flux $\psi_m'$ is measured as $$\psi_m' = v_s(t_m - t_o) \tag{6}$$

Equations (3), (4), (5) and (6) represent different methods of evaluating the phase flux linkage for the purpose of identifying rotor position and thus represent different implementations of the invention.

In the case of equations (5) and (6) the resettable electronic integrators are not required. The measured supply voltage $v_s$ is provided directly to the digital processor. The phase flux $\psi_m$ (or $\psi_m'$) is then computed using equations (5) or (6) by the digital processor.

The various embodiments of the invention described above are all based on the measurement of flux $\psi_m$ and current $i_m$ at a predicted rotor position, the look-up of the expected flux $\psi_e$ for the measured current $i_m$ corresponding to the reference rotor position, and the calculation of the difference $\Delta\theta$ between the reference rotor position and the predicted rotor position according to the equation:

$$\Delta\theta = \left\{ \frac{\partial\theta}{\partial\psi} \right\}_m \cdot (\psi_m - \psi_e) \tag{7}$$

Equation (7) is the combination of the previous equations (1) and (2).

As a further set of embodiments, still based on the measurement of flux $\psi_m$ and current $i_m$ as is the subject of this invention, the expected current $i_e$ for the measured flux $\psi_m$ corresponding to the reference rotor position can be looked up from the characteristic shown in FIG. 4 and used to calculate the true rotor position, instead of using the expected flux $\psi_e$ for the measured current $i_m$. In this case:

$$\Delta\theta = \left\{ \frac{\partial\theta}{\partial i} \right\}_m \cdot (i_m - i_e) \tag{8}$$

Equation (8) is the corollary of equation (7).

For these embodiments it is therefore necessary to store in the digital processor for the reference position values of the partial derivative $\partial\theta/\partial i$ (or its inverse $\partial i/\partial\theta$) for a set of values of flux $\psi$ (rather than storing values of $\partial\theta/\partial\psi$ for a set of values of current i as shown in FIG. 5).

The alternative calculation defined by equation (8) is particularly relevant for the lower speed mode of operation for which exploratory pulses of voltage are applied to the phase windings as described above. Since these pulses may be of fixed time duration and the phase voltage may be substantially the same as the supply voltage, the "measured" flux $\psi_m$ will be substantially the same for each voltage pulse. It is therefore possible, if the supply voltage remains substantially the same, to store only one value for $\partial\theta/\partial\psi$ (or $\partial i/\partial\theta$) corresponding to this particular value of $\psi$ for the reference rotor position.

Although only one illustrative embodiment of the invention has been described in detail, there are many variations that come within the spirit and scope of the invention. Accordingly, the invention is to be limited only as particularly defined in the appended claims.

I claim:

1. A rotor position sensing system for an electric machine with at least one phase associated with at least one monitored phase winding, the rotor position sensing system comprising:

at least one current measurement device to derive measurement of current in the at least one monitored phase winding;

means for deriving measurement of magnetic flux linking the at least one monitored phase winding;

control means for determining rotor angular error between a predicted rotor angular position and a reference rotor angular position for the at least one monitored phase winding, the control means 1) directing the at least one current measurement device and the means for deriving measurement of magnetic flux to provide single, simultaneous current and magnetic flux measurements for the at least one monitored phase winding at the predicted rotor angular position, 2) using one of the current and magnetic flux measurements to determine a partial derivative of rotor angle, and 3) using the other of the current and magnetic flux measurements, an expected value of the other of the current and magnetic flux measurements, and the partial derivative of rotor angle to determine rotor angular error.

2. The system of claim 1, wherein:

the partial derivative of rotor angle is a partial derivative of rotor angle with respect to magnetic flux for given values of current; and the control means uses the magnetic flux measurement, an expected magnetic flux value, and the partial derivative of rotor angle with respect to magnetic flux to determine rotor angular error.

3. The system of claim 2, wherein the control means determines rotor angular error by taking the product of a difference between the magnetic flux measurement and the expected magnetic flux value and the partial derivative of rotor angle with respect to magnetic flux.

4. The system of claim 1, wherein:

the partial derivative of rotor angle is a partial derivative of rotor angle with respect to current for given values of magnetic flux; and the control means uses the current measurement, an expected current value, and the partial derivative of rotor angle with respect to current to determine rotor angular error.

5. The system of claim 4, wherein the control means determines rotor angular error by taking the product of a difference between the current measurement and the expected current value and the partial derivative of rotor angle with respect to phase current.

6. The system of claim 1, further comprising means for calculating the time for the rotor to reach a next rotor reference angular position and for enabling the control means to direct the at least one current measurement device and the means for deriving measurement of magnetic flux to provide single simultaneous current and magnetic flux measurements at a next predicted rotor angular position.

7. The system of claim 1, wherein the control means comprises a digital processor.

8. The system of claim 1, wherein the reference rotor angular position coincides with an angular position at which monitored phase inductance is increasing.

9. The system of claim 1, wherein the reference rotor angular position coincides with an angular position at which monitored phase inductance is decreasing.

10. The system of claim 1, wherein the means for deriving measurement of magnetic flux comprises integrator means for receiving input signals related to current through the at least one monitored phase winding and to voltage across the at least one monitored phase winding, and for outputting a signal related to monitored phase flux linkage.

11. The system of claim 1, wherein the control means stores a machine current and flux prediction algorithm, the algorithm providing a measured rotor angular position based on the product of the difference in measured and expected flux and the rate of change of rotor angle with respect to flux.

12. The system of claim 11, wherein the control means stores a look-up table of values of the partial derivative of rotor angle with respect to flux for each of a set of values of monitored phase current.

13. The system of claim 1, wherein the control means stores a machine current and flux prediction algorithm, the algorithm providing a measured rotor angular position based on the product of the difference in measured and expected current and the rate of change of rotor angle with respect to current.

14. The system of claim 13, wherein the control means stores a look-up table of values of the partial derivative of rotor angle with respect to current for each of a set of values of monitored phase flux linkage.

15. The system of claim 1, wherein the control means predicts the moment at which the rotor will pass a next reference angular position, based on timing the rotor at a measured speed from the reference angular position.

16. The system of claim 15, wherein the control means predicts the moment at which the rotor will pass a next reference angular position, based on timing the rotor at a measured speed and acceleration from the reference angular position.

17. The system of claim 1, further comprising voltage generating means controlled by the control means for inducing a voltage pulse across the at least one monitored phase winding at the predicted rotor angular position, the control means directing measurement of the current in the at least one monitored phase winding and the flux linking the at least one monitored phase winding upon termination of the voltage pulse.

18. The system of claim 1, further comprising an electric reluctance machine controller incorporating the rotor position sensing system.

19. The system of claim 1, wherein the at least one current measurement device comprises a current transducer.

20. A rotor position sensing system for an electric reluctance machine having a rotor and at least one phase comprising monitored phase windings, said system comprising:

at least one current transducer arranged for measurement of current in said monitored phase windings;

at least one flux transducer arranged for measurement of magnetic flux linking said monitored phase windings;

control means, including a digital processor and a memory, for measuring, once per phase cycle for said monitored phase windings, said current and flux simultaneously at a predicted rotor angular position, the control means determining angular error between said predicted position and a reference rotor angular position stored in said memory by comparing one of the measured current and flux with one of the expected current and flux at the reference rotor angular position; and means for calculating the time before said rotor reaches a next reference rotor angular position and for enabling said control means to again direct said measurements at the next predicted angular position.

21. A rotor position sensing system for an electric machine with one or more phases, comprising at least one current transducer arranged for measurement of the current in a monitored phase winding, flux measurement means for deriving a measurement of the magnetic flux linking said monitored phase winding, and position computation means, including data storage means for storing values of expected flux and the partial derivative of the rotor angle with respect to the flux for given values of phase current at a predetermined reference rotor angular position, the position computation means being operable to enable measurement, for the monitored phase winding, of said current and flux simultaneously at a predicted position of said predetermined reference rotor angular position, the angular error between said predicted position and said reference rotor angular position being determined from the product of a difference between the measured flux and the stored flux value and the said partial derivative at the measured current at the actual reference position, the position computation means being arranged to determine the actual position of the rotor from the sum of the angular error and the reference rotor angular position.

22. A rotor position sensing system for an electric machine with one or more phases, comprising at least one current transducer arranged for measurement of the current in a monitored phase winding, flux measurement means for deriving a measurement of the magnetic flux linking said monitored phase winding, and position computation means, including data storage means for storing values of expected phase current and the partial derivative of the rotor angle with respect to the phase current for given values of flux at a predetermined reference rotor angular position, the position computation means being operable to enable measurement, for the monitored phase winding, of said current and flux simultaneously at a predicted position of said predetermined reference rotor angular position, the angular error between said predicted position and said reference rotor angular position being determined from the product of a difference between the measured phase current and the stored current value and the said partial derivative at the measured flux at the actual reference position, the position computation means being arranged to determine the actual position of the rotor from the sum of the angular error and the reference rotor angular position.

* * * * *